May 5, 1936. H. A. W. WOOD Re. 19,958

QUICK CHANGE SPLICING DEVICE

Original Filed June 4, 1927

Witness
B. F. Nissen

Inventor
Henry A. Wise Wood
By Attorneys
Southgate Fay & Hanby.

Reissued May 5, 1936

Re. 19,958

UNITED STATES PATENT OFFICE 19,958

QUICK CHANGE SPLICING DEVICE

Henry A. Wise Wood, New York, N. Y., assignor to Wood Newspaper Machinery Corporation, New York, N. Y., a corporation of Virginia Original No. 1,909,443, dated May 16, 1933, Serial No. 196,517, June 4, 1927. Renewed March 6, 1933. Application for reissue March 29, 1935, Serial No. 13,769

9 Claims. (Cl. 242—58)

This invention relates to a pasting device for the web of a continuously operating printing press.

The principal objects of the invention are to provide a single propelling means for propelling the expiring web roll up to the time of the serving of the web and for propelling the fresh web roll previously pasted and get it up to web speed before it is attached to the web, and to provide means for getting the fresh web roll up to web speed and continuing to rotate it as long as the web is connected with it without changing the propelling device or shifting its engagement with the web roll from the time it is a fresh pasted roll to the time it is an expiring roll stub. This obviously results in the reduction of mechanism and expense due to the fact that a single propelling device is used for the fresh and expiring rolls instead of one for each one as has been the case heretofore.

Other objects and advantages of the invention will appear hereinafter.

Reference is to be had to the accompanying drawing in which

Figure 1:
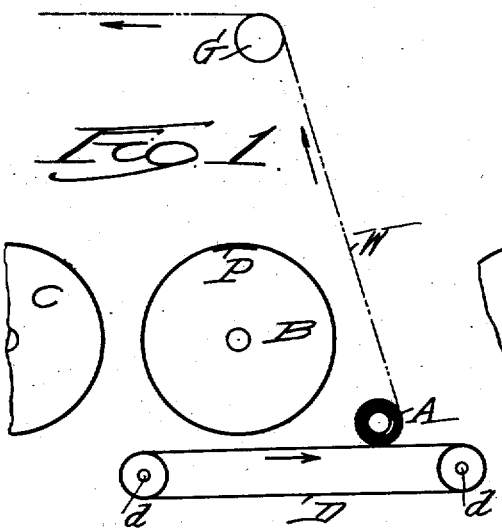
Fig. 1 is a diagrammatic side view of a set of web rolls showing my new method of propelling the running roll throughout the time of feeding a web therefrom to the press.
Figure 4:
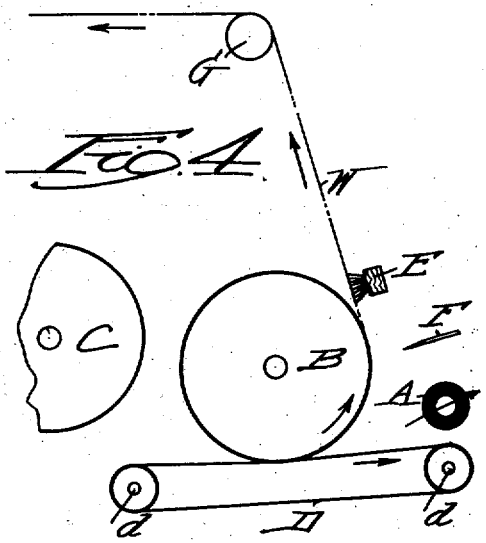
Fig. 4 is a similar view showing the removal of the core of the expiring web roll and the commencement of the running of the web from the fresh roll, the parts being ready to shift back to the position shown in Fig. 1.
Figure 5:
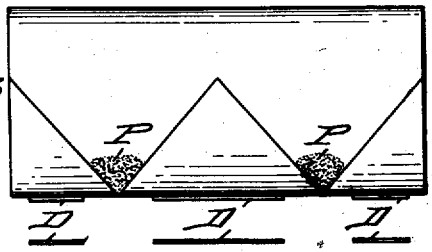
Fig. 5 is a side view of the fresh web roll pasted and illustrating the propelling belts.

According to this invention, the web W is run to the press over a guide-roll G from a running web roll A. This running web roll is shown in Fig. 1 as at the point of expiring. The fresh roll B is shown in Figs. 1 and 5 as provided with paste P in the usual manner. I have also shown an in-coming roll C which will later take the place of the roll B when that takes the place of the roll A in the position just beyond that shown in Fig. 4.

Figure 2:
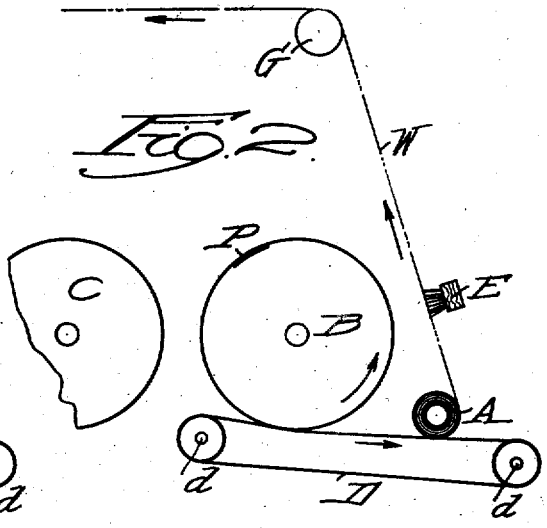
Fig. 2 is a similar view showing the use of the same propelling means for starting the fresh roll and getting it up to web speed without losing its control of the running or expiring roll.
Figure 3:
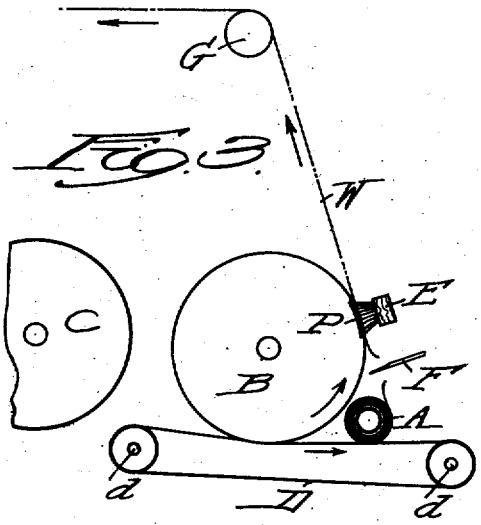
Fig. 3 is a similar view showing the position of the parts after the fresh roll is pasted to the expiring web and the latter severed.

For the purpose of propelling the running roll A and the fresh roll B, I provide a series of driving belts D. These are indicated in these figures as running over pulleys on two shafts *d*, one of these shafts being in stationary bearings, and the other being mounted to move toward and from the fresh roll B. The stationary shaft is operated from the press at such a rate as to drive the belts at web speed. This movement above mentioned is indicated by comparing Figs. 1 and 2, in which the belts D, always in contact with the running or expiring roll A, move into a position in Fig. 2 in which they also engage the surface of the fresh roll B and rotate that so as to bring it up to web speed. After this is accomplished, the web W and the fresh roll B are brought toward each other by moving one or the other as may be desired. In the present instance, by comparison of Figs. 2 and 3 it will be seen that the roll B has been moved up to the web. Furthermore, a means for pressing the web against the fresh roll, shown as taking the form of a brush E, has been moved up so that the expiring end of the web will be forced against the paste stops P on the web roll B. Immediately afterwards, the severing knife F is brought into contact with the web and that is severed from the expiring roll or stub as shown in Fig. 3. Now the expired roll or core A is removed as shown in Fig. 4, the knife F is drawn back and also the brush E. During all this time the belts D have been running the roll B at web speed. From the point shown in Fig. 4, the roll B becomes the running roll and eventually the expiring roll. The roll C is moved into the position of the roll B to become the fresh roll at the desired time.

It will be understood that the driving belts D can be moved as described or the fresh roll B can be moved so long as they are brought together. I have not shown the means for moving these parts as they constitute the features of an independent invention. It will be seen that in all these cases the expiring or running and fresh rolls are driven by a single means constituting a plurality of driving belts rotated by the power from a single shaft. There is no loss of control when a fresh roll becomes the running roll. The only thing necessary to perform the above-mentioned functions is to move this set of belts or the rolls to be driven thereby. This constitutes a simplified method of bringing the fresh roll up to the web speed and keep the running and expiring roll running at web speed all the time. Furthermore, by having only one driving means, there will be no possibility of the two rolls getting out of step with each other or being propelled at two different speeds.

Having thus described the invention and ad-vantages thereof, I do not wish to be limited to the details herein disclosed, otherwise than as set forth in the claims, but what I do claim is:—

1. In a quick change splicing device, the combination with a running or expiring roll for the web, and a fresh web roll, of a series of propelling belts engaging the surface of the running or expiring roll at all times while it is connected with the running web and engaging the surface of the fresh roll to run the fresh roll at web speed for a material period before going out of contact with the surface of the expiring roll, said belts being movable out of contact with the expiring roll at about the time which the web is severed therefrom.

2. In a web splicing mechanism, the combination with a bodily movable and rotatable fresh web roll, of a single set of propelling belts located in position to rotate said roll while the expiring web is being attached thereto and to continue to propel it until it is nearly exhausted, said belts being movable to accommodate the roll in its splicing and running positions, and engaging the surface of the expiring web roll at all times while it is delivering the web and the surface of the fresh roll without going out of contact with the surface of the expiring roll while the latter is operating and then passing out of contact with it.

3. The method of splicing a web which consists in running a surface at web speed in contact with the expiring web roll to control the rotation of said web roll, then moving said surface into contact with the new web roll to rotate said new web roll at the same surface speed while said surface is in contact with the expiring web roll, then moving the fresh roll into position to bring it into contact with the web, forcing the web against the fresh web roll, and severing the web.

4. The method of splicing a web for a printing press which comprises the running of a belt in contact with the web roll to keep the web roll at web speed and the web taut until the roll is nearly exhausted, then bringing said belt into contact with the fresh web roll, which has been pasted, to bring said fresh web roll up to web speed while said belt is in contact with the expiring web roll, then moving the fresh web roll to bring it into contact with the web, forcing the web against the fresh web roll, severing the web, and removing the exhausted stub from contact with said belt, leaving the fresh web roll to be controlled by the belt.

5. In a quick change splicing device, the combination with a running roll and a fresh roll for the web, of a moving member running at a constant speed and engaging the two rolls at different points on its periphery and thus running the two rolls at exactly the same surface speed, said moving member being connected with the press to be operated thereby, and means for pressing the fresh roll and the web from the running roll together to effect a splice.

6. In a quick change splicing device, the combination with a bodily movable and rotatable fresh web roll, of a single set of propelling belts located in position to rotate said roll while the web of the expiring roll is being attached thereto and to continue to propel it until it is nearly exhausted, said belts engaging the surface of said expiring web roll at all times while connected with the web and the surface of the fresh roll without going out of contact with the expiring roll until the web is severed, means for pressing the fresh roll against the web of the expiring roll to effect a splice, and means for severing said web after the splice has been made.

7. In a quick change splicing device, the combination with a running roll and a fresh roll for the web, of a propelling belt runing at a constant speed ratio and simultaneously engaging the two rolls at different points on its periphery, said propelling belt being connected with the press to be operated thereby, and means for pressing the fresh roll and the web from the running roll together to effect a splice.

8. The method of splicing a web for a printing press which comprises running a belt continuously at web speed, contacting the belt with the web roll to keep the web roll at web speed and the web taut until the roll is nearly exhausted, then bringing said belt simultaneously into contact with the fresh web roll, which has been pasted, to bring said fresh web roll up to web speed, pressing the web against the fresh web roll, severing the web, removing the exhausted stub from contact with the belt, and leaving the fresh web roll to be controlled by the belt.

9. In a quick change splicing device for a web press in which fresh web rolls are sequentially rotated and brought up to the speed of the web running through the press from the next preceding roll and then pasted to said running web without stopping said web, the combination of a controller having a traction surface running substantially at such web speed and being driven by the press, said controller being arranged to engage the surface of each fresh roll to bring it up to web speed before such roll engages the running web, means for pressing the roll and running web together to splice the web of the fresh roll to said running web, a knife for severing the latter web after the fresh web has been spliced thereto whereby said fresh web now becomes the running web, said controller constituting the sole speed-controlling means engaging the surface of the successive rolls.

HENRY A. WISE WOOD.